(12) United States Patent
Birch et al.

(10) Patent No.: US 10,801,458 B2
(45) Date of Patent: Oct. 13, 2020

(54) METHODS FOR CONTROLLING STOPPING AND STARTING OF AN ENGINE

(71) Applicant: JAGUAR LAND ROVER LIMITED, Warwickshire (GB)

(72) Inventors: John Birch, Coventry (GB); David McGeoch, Coventry (GB); Jonathan Woodley, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 16/304,723

(22) PCT Filed: May 3, 2017

(86) PCT No.: PCT/EP2017/060531
§ 371 (c)(1),
(2) Date: Nov. 27, 2018

(87) PCT Pub. No.: WO2017/211506
PCT Pub. Date: Dec. 14, 2017

(65) Prior Publication Data
US 2019/0277239 A1    Sep. 12, 2019

(30) Foreign Application Priority Data
Jun. 7, 2016 (GB) .................................. 1609920.2

(51) Int. Cl.
*F02N 11/08* (2006.01)
*F02D 29/02* (2006.01)
(Continued)

(52) U.S. Cl.
CPC ......... *F02N 11/0803* (2013.01); *B60W 40/04* (2013.01); *F02D 29/02* (2013.01);
(Continued)

(58) Field of Classification Search
CPC ............. F02N 11/0803; F02N 11/0837; F02N 2200/124; F02N 2200/125; F02D 29/02;
(Continued)

(56) References Cited

U.S. PATENT DOCUMENTS

| 6,283,086 B1 | 9/2001 | Yamamoto et al. |
| 2003/0029406 A1 | 2/2003 | Weiss |

(Continued)

FOREIGN PATENT DOCUMENTS

| DE | 10-2009-048381 A1 | 4/2011 |
| DE | 10-2011-009001 A1 | 7/2012 |

(Continued)

OTHER PUBLICATIONS

Combined Search and Examination Report under Sections 17 and 18(3) for Application No. GB1609920.2 dated Dec. 29, 2016.
(Continued)

*Primary Examiner* — Mahmoud Gimie
(74) *Attorney, Agent, or Firm* — Carlson, Gaskey & Olds

(57) ABSTRACT

A method (300) of controlling an internal combustion engine (3) of a vehicle (1), comprising: receiving at least one input (301) indicative of a current external environment proximal to the vehicle (1); determining (305) in dependence on the at least one input (301) whether a hazard is present; determining a current propulsion demand (303) of the vehicle (1); if it is determined that the current propulsion demand (303) is low, either commanding switching of the internal combustion engine (3) to an off state (307) if it is determined that a hazard is not present, or not commanding switching of the internal combustion engine (3) to the off state if it is determined that a hazard is present; and if it is determined that the current propulsion demand (303) is high, commanding switching of the internal combustion engine (3) to an on state if the internal combustion engine (3) is in the off state.

20 Claims, 5 Drawing Sheets

(51) Int. Cl.
  *B60W 40/04*   (2006.01)
  *F02D 41/04*   (2006.01)

(52) U.S. Cl.
  CPC ........ *F02D 41/042* (2013.01); *F02N 11/0837* (2013.01); *F02D 2200/70* (2013.01); *F02N 2200/124* (2013.01); *F02N 2200/125* (2013.01); *Y02T 10/48* (2013.01)

(58) Field of Classification Search
  CPC .............. F02D 2200/70; F02D 41/042; B60W 2550/20; B60W 2550/10; B60W 2550/14; B60W 40/04
  USPC ...................................................... 123/179.4
  See application file for complete search history.

(56) References Cited

U.S. PATENT DOCUMENTS

| | | |
|---|---|---|
| 2007/0111857 A1 | 5/2007 | De Mersseman |
| 2012/0132176 A1 | 5/2012 | Sawada et al. |
| 2012/0270701 A1* | 10/2012 | Christen ............. F02N 11/0818 477/171 |
| 2012/0323403 A1 | 12/2012 | Okita et al. |
| 2013/0191005 A1 | 7/2013 | Hrovat et al. |
| 2014/0005914 A1* | 1/2014 | Bernzen .............. F02N 11/0833 701/112 |
| 2017/0282921 A1* | 10/2017 | Limbacher ...... B60W 30/18018 |

FOREIGN PATENT DOCUMENTS

| | | |
|---|---|---|
| DE | 10-2014-014293 B3 | 11/2015 |
| GB | 2489109 A | 9/2012 |
| JP | 2004232538 A | 8/2004 |
| JP | 2014224458 A | 12/2014 |
| WO | 2008/059347 A2 | 5/2008 |

OTHER PUBLICATIONS

International Search Report and Written Opinion of the International Searching Authority for International application No. PCT/EP2017/060531 dated Jul. 10, 2017.

\* cited by examiner

METHODS FOR CONTROLLING STOPPING AND STARTING OF AN ENGINE

TECHNICAL FIELD

The present disclosure relates to a method of controlling an internal combustion engine of a vehicle. In particular, but not exclusively it relates to a method of controlling stopping and starting of an internal combustion engine of a vehicle.

Aspects of the invention relate to a method, a controller, a vehicle, and a computer-readable storage medium.

BACKGROUND

It would be desirable to stop an internal combustion engine of a vehicle while the vehicle is moving. This energy saving measure will reduce fuel consumption and reduce emissions.

It is an aim of the present invention to address disadvantages associated with the prior art.

SUMMARY OF THE INVENTION

Aspects and embodiments of the invention provide a method, a controller, a vehicle, and a computer-readable storage medium as claimed in the appended claims.

According to an aspect of the invention there is provided a method of controlling an internal combustion engine of a vehicle, comprising: receiving at least one input indicative of a current external environment proximal to the vehicle, determining in dependence on the at least one input whether a hazard is present; determining a current propulsion demand of the vehicle; if it is determined that the current propulsion demand is low, either commanding switching of the internal combustion engine to an off state if it is determined that a hazard is not present, or not commanding switching of the internal combustion engine to the off state if it is determined that a hazard is present; and if it is determined that the current propulsion demand is high, commanding switching of the internal combustion engine to an on state if the internal combustion engine is in the off state.

This provides the advantage of ensuring that the internal combustion engine is in its on state in advance of an expected rapid increase in propulsion demand by a driver of the vehicle responding to a putative hazard in the external environment. An example of a putative hazard is an obstacle in the road that can be overtaken if the driver should choose to do so. Determining that a hazard is present may comprise identifying the putative hazard and identifying a propulsion demand.

In some examples, if it is determined that the current propulsion demand is low, and the internal combustion engine is in the off state, the method comprises either commanding switching of the internal combustion engine to the on state if it is determined that a hazard is present, or not commanding switching of the internal combustion engine to the on state if it is determined that a hazard is not present.

This provides the advantage of ensuring that the internal combustion engine switches to its on state in advance of an expected rapid increase in propulsion demand by the driver of the vehicle responding to the putative hazard.

Determining that a hazard is not present may comprise determining an expected low or no increase of future propulsion demand, and determining that a hazard is present may comprise determining an expected future propulsion demand or increase of propulsion demand. This provides the advantage of saving energy if it is expected that the driver will not increase propulsion demand.

The at least one input may comprise inputs from a plurality of different sensors. The at least one input may comprise at least one of: image data; location data; pulse reflection data; information received from another vehicle and/or an infrastructure management system via a wireless network. This provides the advantage that hazards are less likely to be missed.

Determining whether a hazard is present may comprise sensing in the current external environment proximal to the vehicle an environment likely to require deceleration of the vehicle. This provides the advantage that only environments that can cause damage if the driver does not brake and/or stop the vehicle, such as collision damage to the vehicle and/or harm to its occupants, can be determined to be present hazards.

Determining whether a hazard is present may comprise determining a rate of closure between the vehicle and a sensed object. A rate of closure has units of velocity. In some examples the sensed object is an object within line of sight of the driver. Determining that a hazard is present may comprise determining that the vehicle and the sensed object are converging. This provides the advantage that only environments that require the driver to decide whether to decelerate or not decelerate in reaction to the object can be determined to be present hazards.

Determining whether a hazard is present may comprise determining a current reduction in the rate of closure. Determining that a hazard is present may comprise determining there is no current reduction in the rate of closure, or the current reduction in the rate of closure does not exceed a threshold. This provides the advantage that only the types of environments for which the driver has not finally committed to decelerating the vehicle can be determined to be present hazards.

Determining whether a hazard is present may comprise determining whether the vehicle is being controlled to reduce the rate of closure. Determining that a hazard is present may comprise determining that the vehicle is not being controlled to reduce the rate of closure. This provides the advantage that only the types of environments for which the driver has not finally committed to decelerating the vehicle can be determined to be present hazards.

The hazard may comprise at least one of: an active hazard that arises because of actions taken by the driver of the vehicle and/or by other road users; and a passive hazard that arises because of at least one of: road layout, road infrastructure, and topography. This provides the advantage that a wide variety of putative hazards can be determined to be present hazards.

The active hazard may comprise a road user ahead of the vehicle travelling slower than the vehicle or slowing. This provides the advantage that the method can assist overtaking.

The passive hazard may comprise at least one of: a terrain feature capable of causing damage to at least the vehicle; a road layout feature giving other road users right of way; a road infrastructure feature giving other users right of way. This provides the advantage that potential future active hazards can be anticipated.

The terrain feature may comprise a submerged driving surface. This provides the advantage that the potential future active hazard of the vehicle becoming stranded in water can be anticipated.

The road layout feature may comprise a junction. This provides the advantage that the method can assist a junction maneuver.

Determining whether a hazard is present may comprise recognizing a hazard sign using image processing.

In some examples, the internal combustion engine in the off state is decoupled from at least one vehicle wheel.

According to another aspect of the invention there is provided a method of controlling a propulsion system of a vehicle comprising: causing or performing switching of the propulsion system to an off state in dependence on current low propulsion demand only if it is determined by processing of at least one signal indicative of a current external environment proximal to the vehicle that a hazard is not present.

This provides the advantage that the method can be applied to any means of propulsion capable of accelerating the vehicle and of wasting energy while not being used to accelerate the vehicle, not limited to an internal combustion engine.

According to a further aspect of the invention there is provided a controller comprising means for performing one or more of the described methods. In some examples, the means for performing one of more of the described methods is at least one processor; and at least one memory, including computer program code; the at least one memory and the computer program code configured to, with the at least one processor, cause operation of one or more of the described methods.

According to a further aspect of the invention there is provided a vehicle comprising the controller.

According to a further aspect of the invention there is provided a computer readable storage medium storing computer program instructions that, when performed by at least one processor, causes one of more of the described methods to be performed.

According to a further aspect of the invention there is provided a method of controlling an internal combustion engine of a vehicle, comprising: receiving at least one input indicative of a current external environment proximal to the vehicle; if at least one condition dependent on the at least one input is not satisfied, switching the internal combustion engine to an off state in dependence on current low propulsion demand; and if the at least one condition associated with the at least one input is satisfied, not switching the internal combustion engine to an off state in dependence on current low propulsion demand. The at least one condition may be any condition that is met when at least one hazard as described herein is determined to be present by processing of the at least one input, otherwise the condition is not met.

According to some, but not necessarily all examples there is provided a method of controlling an internal combustion engine of a vehicle, comprising: receiving at least one input indicative of a current external environment proximal to the vehicle, and determining in dependence on the at least one input whether a hazard is present; if it is determined that a hazard is not present, enabling the internal combustion engine to switch to an off state in dependence on a current low propulsion demand; and if it is determined that a hazard is present, not enabling the internal combustion engine to switch to an off state in dependence on a current low propulsion demand.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
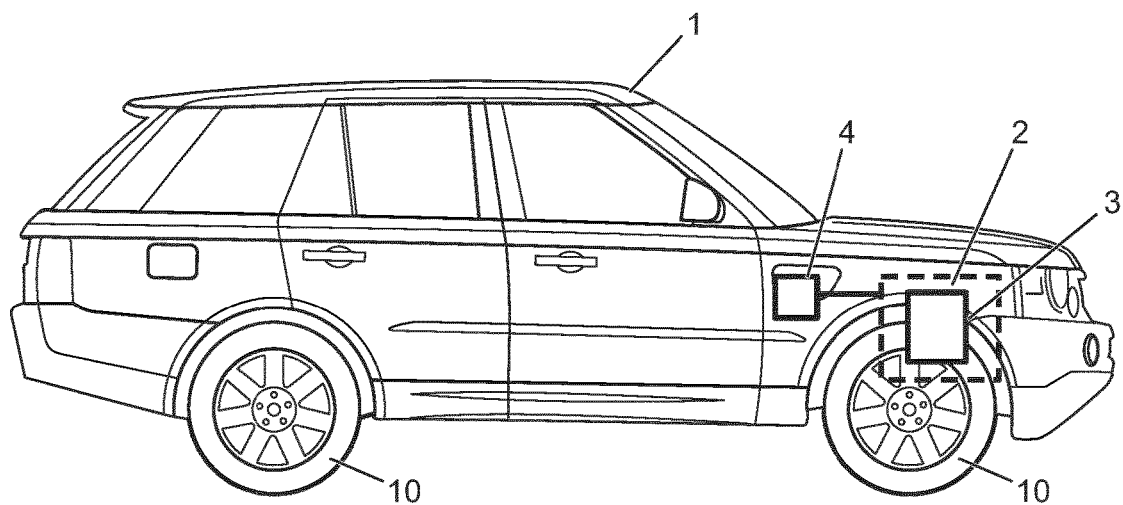
FIG. 1 illustrates an example of a vehicle 1.

The Figures illustrate a method 300, 400, 500, 600 of controlling an internal combustion engine 3 of a vehicle 1, comprising: receiving at least one input 301, 401, 501, 601 indicative of a current external environment proximal to the vehicle 1; determining 305, 460, 650 in dependence on the at least one input whether a hazard is present; determining a current propulsion demand 303 of the vehicle 1; if it is determined that the current propulsion demand 303 is low, either commanding switching of the internal combustion engine 3 to an off state 307 if it is determined that a hazard is not present, or not commanding switching of the internal combustion engine 3 to the off state if it is determined that a hazard is present; and if it is determined that the current propulsion demand 303 is high, commanding switching of the internal combustion engine 3 to an on state if the internal combustion engine 3 is in the off state.

FIG. 1 illustrates an example of a suitable vehicle 1 within which the described methods could be performed. The vehicle 1 may be a passenger vehicle. The vehicle 1 comprises a propulsion system 2 for propelling the vehicle 1, comprising an internal combustion engine 3.

Other propulsion systems 2 are possible, for example hybrid propulsion systems comprising the internal combustion engine 3 and another means of propulsion (not shown).

The vehicle 1 of FIG. 1 also comprises a controller 4 operably coupled to the propulsion system 2 for performing the described methods.

Figure 2A:
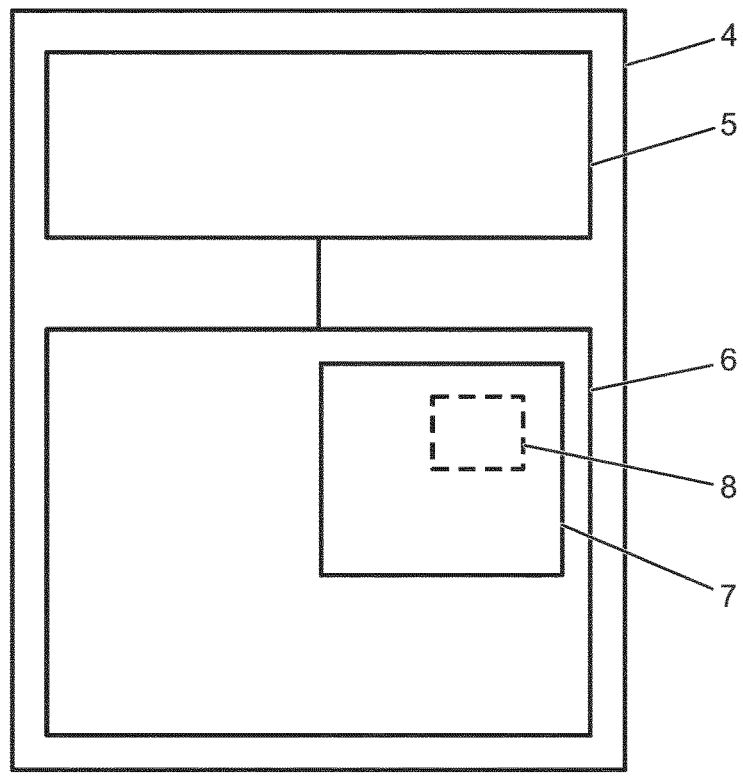
FIG. 2A illustrates an example of a controller 4.

FIG. 2A illustrates an example of the controller 4. In the example of FIG. 2A, the controller 4 comprises at least one processor 5; and at least one memory 6, including computer program code 8; the at least one memory 6 and the computer program code 8 configured to, with the at least one processor 5, cause operation of the described methods.

Figure 2B:
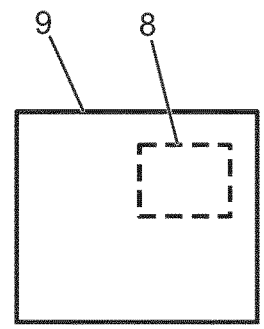
FIG. 2B illustrates an example of a computer readable storage medium 9.

As illustrated in FIG. 2B the described methods may be implemented using instructions that enable hardware functionality, for example, by using executable instructions 8 of a computer program 7 in a general-purpose or special-purpose processor 5 that may be stored on a computer readable storage medium 9 (disk, memory etc) to be executed by such a processor 5.

According to some, but not necessarily all examples, the controller 4 is operable to command the internal combustion engine 3 to switch between an on state ('active' or 'started' engine state) and an off state ('inactive' or 'stopped' engine state).

The internal combustion engine 3 in the on state is able to produce torque for propelling the vehicle 1 to cause the vehicle 1 to accelerate. The internal combustion engine 3 in the on state is operably coupled to at least one vehicle wheel 10 via mechanical components (not shown). Fuel is supplied to the internal combustion engine 3 in the on state for conversion into mechanical energy for propelling the vehicle 1.

The internal combustion engine 3 in the off state is not able to produce torque for propelling the vehicle 1. In some examples, the internal combustion engine 3 in the off state is decoupled from the at least one vehicle wheel 10, allowing a rotatable crankshaft (not shown) within the internal combustion engine 3 to cease rotation while the vehicle wheel 10 continues to rotate. In some examples, no fuel is supplied to the internal combustion engine 3 in the off state.

According to some, but not necessarily all examples, the controller 4 is operable to command the internal combustion engine 3 to switch to the off state in dependence on a current low propulsion demand, for example to save fuel. The controller 4 is operable to command the internal combustion engine 3 to switch back to the on state in dependence on a current high propulsion demand, if the internal combustion engine 3 is in the off state.

The internal combustion engine 3 can switch to the off state in response to a current low propulsion demand while the vehicle 1 is in motion relative to its surroundings, or at any other time between the vehicle 1 being switched by its driver to an ignition-on ('key-on') vehicle state, and being switched by its driver to an ignition-off ('key-off') vehicle state.

Propulsion demand refers to an amount of propulsion energy such as positive torque for propelling the vehicle 1, requested from the propulsion system 2 in response to a driver torque request such as an accelerator pedal input, while the vehicle 1 is 'key-on'.

Propulsion demand is determined by the controller 4 in dependence on a measurement made using any suitable sensing means, for example using an accelerator pedal position sensor.

Propulsion demand is a variable having a plurality of levels. A plurality of levels may comprise more than ten levels, in other examples there may be more than a hundred levels or more than a thousand levels of propulsion demand.

Low propulsion demand refers to, for example, a propulsion demand condition which is met while there is no propulsion demand or while the propulsion demand is below a propulsion demand threshold. In some examples the propulsion demand condition is met while none of the vehicle wheels 10 receive propulsion torque from the propulsion system 2.

High propulsion demand refers to, for example, a propulsion demand condition which is met while there is propulsion demand or while the propulsion demand is above a threshold such as the propulsion demand threshold. In some examples the high propulsion demand condition is met while at least one vehicle wheel 10 receives propulsion torque from the propulsion system 2.

Current propulsion demand refers to a real-time measurement of propulsion demand received by the controller 4. The controller 4 may respond in real-time to command the internal combustion engine 3 to switch to the off state a short delay after the current propulsion demand becomes low. The internal combustion engine 3 may switch back to the on state from the off state with a similar short delay or even shorter delay after the current propulsion demand ceases to be low. In both cases the delay may be a time less than: 5 seconds; 2 seconds; or 0.5 seconds. The delay time is linked to hardware capability, and in some examples to trigger conditions such as a pre-programmed delay in switching to the off state.

FIGS. 3 to 6 illustrate examples of methods for further enhancing the functionality of the controller 4.

Figure 3A:
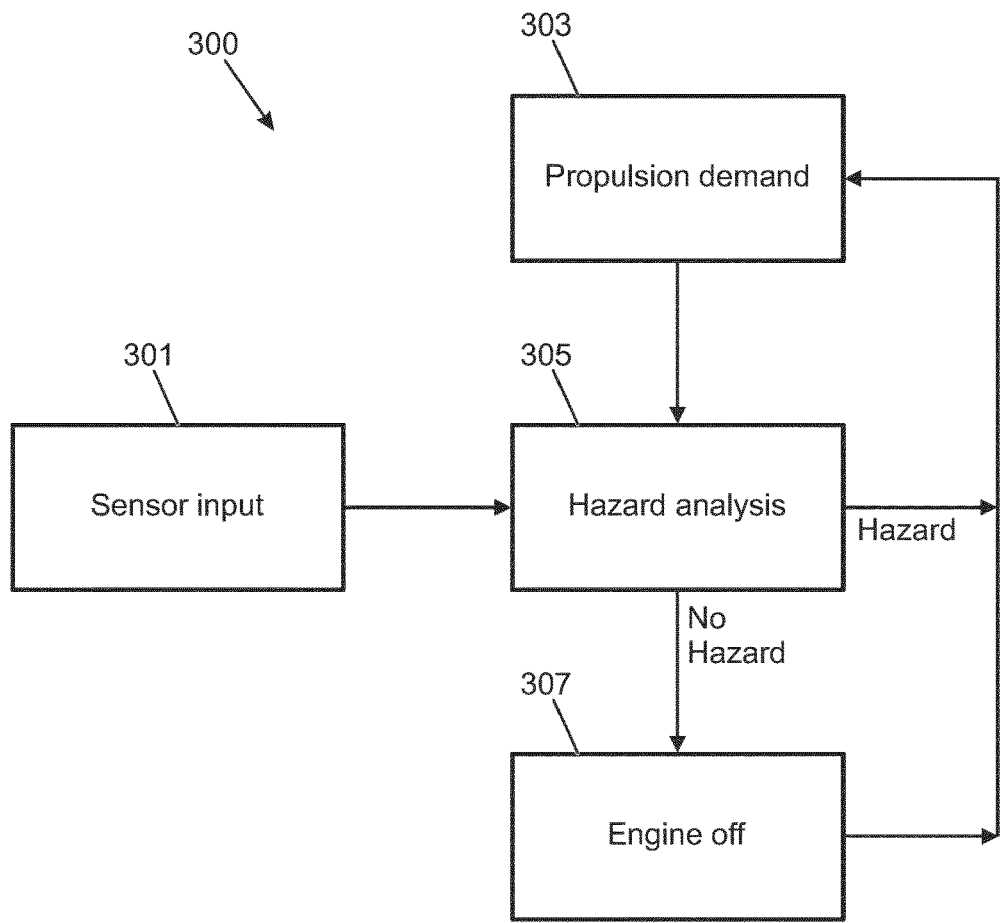
FIG. 3A illustrates an example method 300.

FIG. 3A illustrates an example of a method 300. The method 300 comprises at block 301 receiving at least one input indicative of a current external environment proximal to the vehicle 1.

The input comprises input data which may be received directly from any suitable sensor on the vehicle 1 arranged to sense the current environment external to the vehicle 1, or indirectly via one or more intervening elements.

The received input is indicative of the current environment because there is a minimal time delay between the recording of data by the sensor and the receiving of the input comprising the data, for example less than one second.

In some examples the input data comprises local real-time context data indicative of a local real-time context around the vehicle 1 and external to the vehicle 1. This local real-time context data enables information on objects within monitored field of view of the sensor to be determined by processing the data and recognizing objects. Recognition of objects can be performed using any suitable technique such as image processing.

The local real-time context data indicates real-time context, therefore objects seen by the driver which are transient features within the environment, such as other road users including pedestrians or other vehicles, or temporary street furniture such as road works objects, can be determined.

Examples of suitable inputs of local real-time context data received at block 301 include at least one of: image data, audio data, transmitted pulse reflection data; information received from another vehicle or infrastructure management system via a wireless network. Image data can be received from at least one of: a visual camera; an infrared camera, on the vehicle 1. Pulse reflection data can be received from a pulse reflection sensor such as a radar or LIDAR (Light Detection and Ranging) sensor on the vehicle 1. Audio data can be received from a microphone on the vehicle 1. Information received from another vehicle or infrastructure management system can be received by a wireless receiver or transceiver on the vehicle 1.

Information from another vehicle can comprise information concerning the speed, position and direction of the another vehicle, or any other suitable information concerning the local real-time context around the vehicle 1. Information from an infrastructure management system may comprise congestion information, information concerning the state of a road infrastructure object such as a traffic light, or any other suitable information concerning the local real-time context around the vehicle 1.

In some examples the sensor provides a field of view and the sensor is oriented such that the direction of travel of the vehicle 1 is within the limits of the field of view of the input data. The sensor can comprise a forward facing camera oriented in the forward direction of travel of the vehicle 1.

In some examples the input data comprises location-based data. Location-based data does not necessarily enable all aspects of the local real-time context around the vehicle 1 to be determined. For example location-based data does not enable objects which are transient features within the environment seen by the driver, such as other road users, to be determined. Location-based data may comprise mapping data and may indicate the current location of the vehicle 1 within a virtual map.

Location-based data can enable objects such as road layout changes to be recognized by processing the input data. Recognizing a road layout change can comprise determining that the vehicle 1 is approaching a junction at which the vehicle 1 does not have right of way. In some examples a type of junction, such as whether the junction is a cross-roads, a roundabout or a T-junction, is recognized. In some examples, whether the vehicle 1 has right-of-way at the junction is recognized.

In some examples only the next road layout change, or next few road layout changes along a determined route of the vehicle 1, are recognized, without processing location-based data indicative of the whole of a remaining route or a substantial portion of the route thereof. Therefore the location-based data only comprises road layout changes proximal to the current location of the vehicle 1.

Location-based data can be received from a GNSS (Global Navigation Satellite System) sensor, or can be determined using data from a GNSS sensor.

The method 300 comprises determining, at block 303, a current propulsion demand, in dependence upon information from any suitable sensor such as a driver actuatable sensor, for example an accelerator pedal position sensor.

The method 300 comprises determining, at block 305, in dependence on the received input(s), whether a hazard is present.

In some examples a hazard is determined to be present if at least two hazard analysis conditions applied to the at least one input are met. To meet the first condition (identify a putative hazard), processing of the at least one input reveals a hazard environment within the current external environment proximal to the vehicle 1 in which there is a greater than a threshold (non-zero) likelihood that the vehicle 1 and/or its occupants will be damaged. The hazard environment could comprise one or more recognized objects, for example, an upcoming junction or a slower moving vehicle.

In some examples the threshold is whether or not a certain object is recognized such as a different vehicle from the vehicle 1 or a junction. In some examples the recognized object must also be within a threshold distance of the vehicle 1. In some examples a quantitative decision is made whether an environment is a hazard environment, for example by computing a score quantifying the likelihood of damage posed by the environment and comparing the score against a threshold.

To meet the second condition (identify a propulsion demand), processing of the at least one input, and in some examples driver behavior data, reveals that the driver is expected to increase future propulsion demand in reaction to the hazard environment. In some examples this is achieved by determining that the likelihood of damage can be reduced by the driver increasing propulsion demand. It may also be determined that the likelihood of damage could only be reduced by the driver braking unusually severely, for example for the specific driver.

An example of a hazard which meets both the first and second conditions will be described. Firstly, processing of local real-time context data reveals a slower moving vehicle ahead of the vehicle 1, travelling in the same direction as the vehicle 1. The first condition for identifying a putative hazard is met, for example because the slower moving vehicle has been recognized, or because the other vehicle is within a certain distance of the vehicle 1.

Secondly, processing of the local real-time context data, and in some examples the speed of the vehicle 1 and accelerator pedal position of the vehicle 1, reveals the rate of closure of the vehicle 1 to the slower moving vehicle and in some examples whether the rate of closure is changing. The processing reveals that the driver would have to brake significantly harder than usual to avoid hitting the slower moving vehicle, for example braking above a vehicle-specific or driver-specific threshold deceleration. This meets the second condition for identifying a propulsion demand because it can be deduced that the driver is considering overtaking the slower vehicle and is likely to increase or is increasing propulsion demand.

In some examples a determined hazard can be described as an active hazard or a passive hazard.

Active hazards arise because of sensed actions such as maneuvers taken by the driver of the vehicle 1 and/or by other road users such as pedestrians, animals, pedal cyclists or drivers of other vehicles. Active hazards require the vehicle 1 to accelerate or brake to avoid damage. The above example of the slower moving vehicle is an example of an active hazard.

Passive hazards do not arise from action by the vehicle 1 and/or other road users. Passive hazards include sensed environments in which the likelihood of an active hazard arising and/or damage occurring is high but not certain. Examples of passive hazards include: terrain features capable of causing damage to at least the vehicle 1; road layout features giving other road users right of way; or road infrastructure features giving other users right of way. In some examples passive hazards are stationary objects or features.

In some examples the threshold for testing the first condition may be set such that putative hazards having a low likelihood of causing damage can be ignored by the hazard analysis. Some environments are not damage-likely hazard environments because the likelihood of damage is less than the threshold, even if there is a likelihood of increased propulsion demand. Examples of such environments include increases in road gradient; straightening the vehicle 1 coming out of a bend or turn; increases in speed limit; or slower vehicles cruising in other lanes from the vehicle 1.

If a hazard is determined to be present at block 305, then it would be desirable to keep the internal combustion engine 3 in the on state to enable the internal combustion engine 3 to respond quickly to an expected future increase in propulsion demand.

If, at block 305, it is determined that a hazard is not present, the method 300 proceeds to block 307 in which the method 300 commands the internal combustion engine 3 to switch to the off state. If the internal combustion engine 3 is already in the off state then the internal combustion engine 3 remains in the off state. In this case the internal combustion engine 3 is able to switch to the off state when current propulsion demand is low.

If, however, at block 305, it is determined that a hazard is present, the method 300 does not proceed to block 307. If the internal combustion engine 3 is already in the off state then it switches to the on state. In this case the internal combustion engine 3 is not able to switch to the off state or remain in the off state when current propulsion demand is low.

In some examples the method 300 repeats at a later time to determine again at block 305 whether a hazard is present, using updated data from the at least one input and/or an updated current propulsion demand.

Figure 3B:
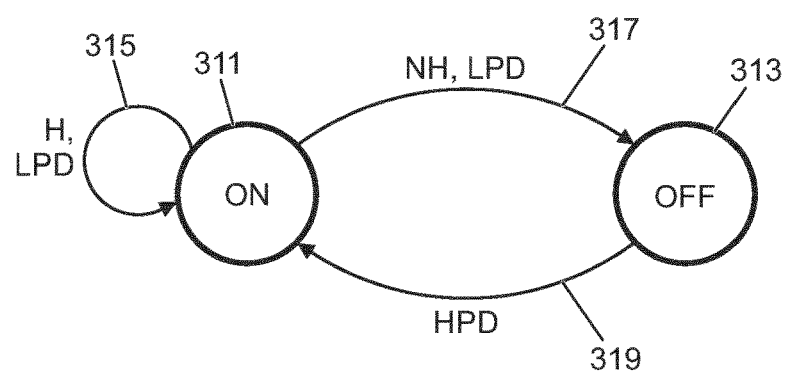
FIG. 3B illustrates a state diagram.

The interaction between the methods described herein and the state of the internal combustion engine 3 is illustrated in the state diagram shown in FIG. 3B. The internal combustion engine 3 can be in one of two states: the on state 311; or the off state 313. As stated above, the state of the internal combustion engine 3 can be controlled by a controller 4.

While the internal combustion engine 3 is in the on state 311, the internal combustion engine 3 remains 315 in the on state 311 if it is determined that the current propulsion demand 303 is low ("LPD") and it is determined that a hazard is present ("H").

The internal combustion engine 3 transitions 317 from the on state 311 to the off state 313 if it is determined that the current propulsion demand 303 is low ("LPD") and it is determined that a hazard is not present ("NH").

The internal combustion engine 3 transitions 319 from the off state 313 to the on state 311 if it is determined that the current propulsion demand 303 is high ("HPD"). In some examples this transition 319 occurs regardless of whether it is determined that a hazard is present. The state diagram of FIG. 3B shows that the internal combustion engine 3 operates in the on state 311 and does not transition to the off state 313 while a hazard is present (H) and/or while propulsion demand is high (HPD).

The state diagram of FIG. 3B shows that the internal combustion engine 3 operates in the off state 313 and does not transition to the on state 311 while a hazard is not present (NH) and propulsion demand is low (LPD).

Figure 4:
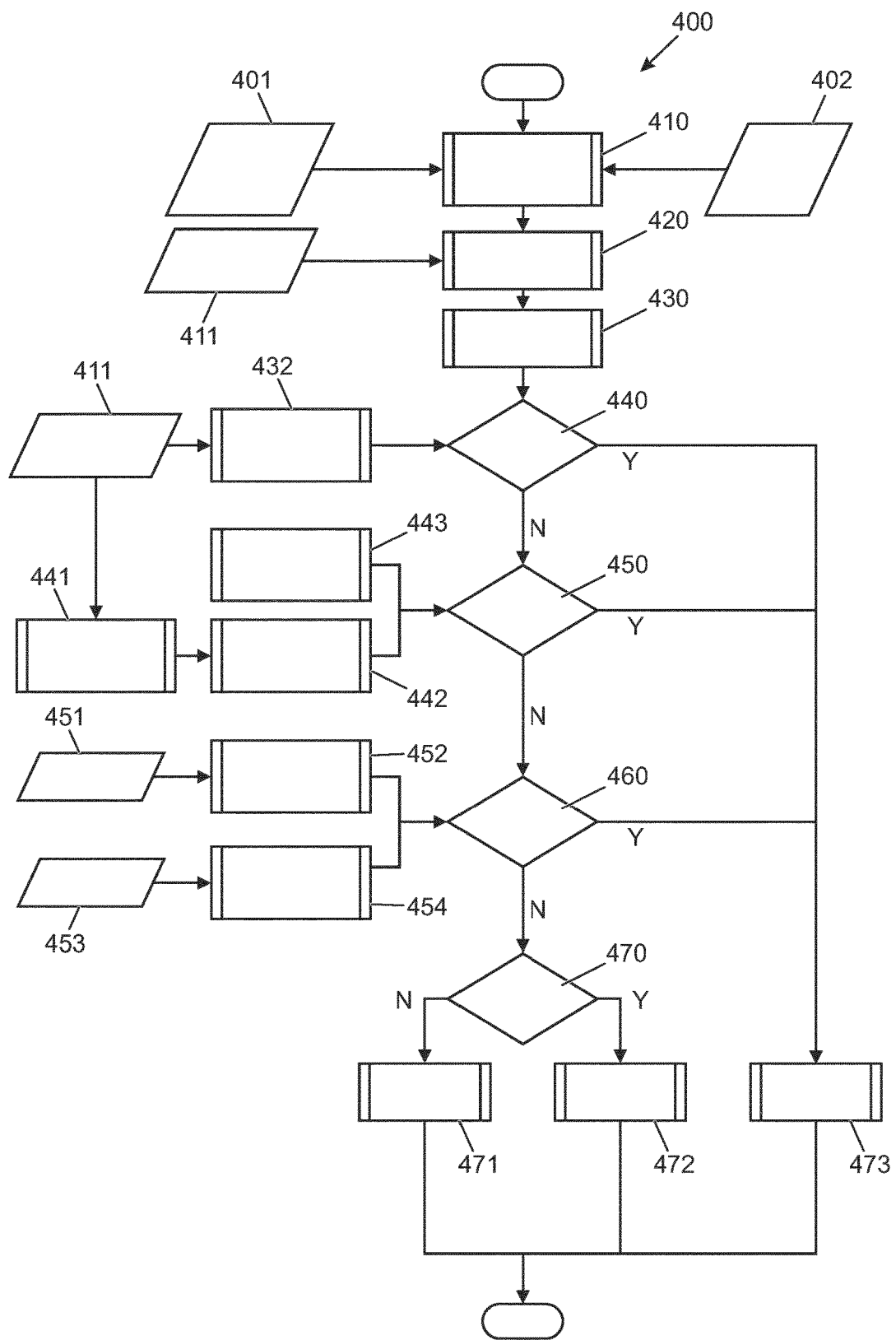
FIG. 4 illustrates another example method 400.

FIG. 4 illustrates an example of a method 400 which relates to a stopping scenario. In some examples: at least one of blocks 401 and 402 performs the function of block 301; at least one of blocks 410, 420, 430, 440, 450 and 460 performs the function of block 305; and block 473 performs the function of block 307.

The method 400 comprises, at block 401, receiving input indicative of a current external environment proximal to the vehicle 1. In this example the input comprises local real-time context data including image data from one or more cameras and/or data from radar sensors and/or LIDAR sensors mounted on the vehicle 1. In some examples the inputs from at least block 401 are fused, for example to increase the accuracy of object recognition. To improve the accuracy, inputs from different sensors may be combined, compared and/or evaluated.

The method 400 comprises, at block 402, receiving additional input indicative of a current external environment proximal to the vehicle 1. In this example the additional input is location-based data comprising GPS (Global Positioning System) mapping data containing route information data concerning road layout changes and/or junction type.

The method 400 proceeds to determine, in dependence on the received input(s), whether a hazard is present, starting from block 410.

In some examples, a hazard environment defining a reason for the vehicle 1 to stop (come to a halt) is identified in block 410. The hazard environment meets at least the first condition for the determination of a hazard, as described in relation to block 305.

In some examples, the object or objects recognized as forming the hazard environment is associated with a passive hazard. The object can comprise a road layout feature giving other road users right of way such as: a junction such as a T-junction; cross-roads; or a roundabout. The object can comprise a road infrastructure feature giving other road users right of way such as: a static object such as a stop sign or a dynamic object such as a traffic light changing to a colour that indicates the vehicle 1 does not have right of way. In some examples that colour is a red colour. Usually the driver may stop before the road layout feature or road infrastructure feature, however sometimes the driver will, for example, perceive an opportunity to pull out of a junction without stopping. This may require acceleration of the vehicle 1.

In some examples, the object is associated with an active hazard. The object can comprise a slowing road user ahead of and in the path of the vehicle 1, which may be slowing to a stop in a queue of vehicles. Usually the driver may be prepared to stop behind the road user, however sometimes the driver will, for example, perceive an opportunity to change into another lane of moving traffic. This may require acceleration of the vehicle 1.

In some examples, the object is a hazard sign, such as a road marking on the road surface, or any sign comprising a symbolic representation of a hazard. The symbolic representation can comprise a symbol or text corresponding to an entry in an object recognition database. In some examples a symbol refers to illustrations on a sign board, and/or the shape of the sign board itself.

In the example of FIG. 4, the method 400 proceeds to blocks 420 to 460. In some examples, blocks 420 to 460 each define steps in the determination of whether the second condition for the determination of a hazard, as described in relation to block 305, is met.

Determining whether a hazard is present comprises, at block 420, determining a rate of closure between the vehicle 1 and a sensed object such as a junction or road user in front of and in the path of the vehicle 1. Rate of closure has units of velocity.

In some, but not necessarily all examples, the speed of the other road user is known, for the purposes of determining the rate of closure. The speed could be known from sensing and/or via communication between networked autonomous vehicles.

The determination at block 420 uses vehicle speed information 411 from a suitable sensor such as a vehicle wheel speed sensor in an anti-lock braking system; and distance information establishing a distance to the sensed object, for example from image processing.

In some, but not necessarily all examples determining that a hazard is present comprises determining, at block 420, that the vehicle 1 and the sensed object are converging, i.e. corresponding to a positive rate of closure. For instance the vehicle 1 is approaching the sensed object such that the vehicle 1 and the object are on a collision course. If the vehicle 1 and the sensed object are not converging, then a hazard is determined not to be present.

In some examples, block 420 comprises determining a distance to the sensed object as well as the rate of closure.

In the example of FIG. 4, the method 400 proceeds to block 430. Determining whether a hazard is present comprises, at block 430, calculating a threshold change in the rate of closure, for example deceleration of the vehicle 1, for stopping the vehicle 1. A change in rate of closure has units of acceleration.

In some examples the calculation determines the threshold, for example by retrieving a threshold from a memory 6. The threshold can be any suitable value that is less than the peak deceleration capability of the vehicle 1. In some examples the threshold is within the range of magnitudes $0 \text{ g} < \text{threshold} \leq 1 \text{ g}$. In some examples the threshold is a smooth braking threshold within the range of magnitudes $0.1 \text{ g} < \text{threshold} \leq 0.4 \text{ g}$. The threshold can be vehicle-model specific or generic, but is not necessarily driver-specific. In some examples the value of the threshold can be modified by the driver. In some examples the value of the threshold depends on the gradient of the road measured, for example by an inclinometer.

In some examples the threshold is calculated as a deceleration no higher than an average deceleration required if the vehicle 1 is to stop before the vehicle 1 reaches or collides with a sensed object.

In the example of FIG. 4, the method 400 proceeds to block 440. Determining whether a hazard is present comprises, at block 440, determining whether a current change in the rate of closure, determined for example at block 432 using vehicle speed information 411, is a deceleration exceeding the threshold change in the rate of closure calculated at block 430.

If block 440 determines that the current reduction in the rate of closure exceeds the calculated threshold change in the rate of closure, for example the threshold deceleration, then the method 400 proceeds to block 473 which allows or continues to allow the internal combustion engine 3 to be switched to the off state ("inactive state") in dependence on a current low propulsion demand. This is because it is deduced that the driver is braking or coasting to decelerate the vehicle 1 to a stop in accordance with normal deceleration behaviour, so there is no reason to expect a future rapid increase in propulsion demand for avoiding collision with the object.

If there is no reduction in the rate of closure or the current reduction in the rate of closure does not exceed the calculated threshold change in the rate of closure, then it is deduced that the driver is maintaining vehicle speed or accelerating and therefore has no intention to bring the vehicle 1 to a stop. The method 400 proceeds to block 450.

In a variation of the method 400, the method 400 proceeds straight from block 420 to block 450 without performing blocks 430 or 440. In an alternative variation, the method 400 skips block 450 and performs blocks 430 and 440.

Determining whether a hazard is present comprises, at block 450, determining whether the current reduction in the rate of closure, determined for example at block 432 using vehicle speed information 411, exceeds a driver-specific threshold deceleration. Block 450 therefore evaluates whether the specific driver is likely to apply an above-threshold deceleration to stop the vehicle 1.

In some examples, the driver-specific threshold deceleration is calculated at blocks 441 and 442 by determining who is driving the vehicle 1, for example by processing data obtained by a sensor or a driver-specific device carried by the driver and received by the processor 5, and comparing the data with driver information stored in a memory 6 of the vehicle 1.

In this example, the driver-specific threshold deceleration is calculated by determining, at blocks 441 and 442, the driver's historical average deceleration when braking the vehicle 1 to a stop. The historical data can be stored in memory 6 which can comprise several minutes, hours, days, weeks, months or years of historical data. An average is only one example of a measure of statistical significance (likelihood of stopping), other statistical parameters could be used in other examples. In some examples the value of the driver-specific threshold deceleration for each driver can be modified by each driver. The use of historical data enables drivers who use heavy and/or late braking techniques to be identified.

In some examples the historical data is filtered such that the average is calculated only from data indicative of deceleration events that brought the vehicle 1 to a stop. Deceleration events that did not stop the vehicle 1 may be filtered out.

In other examples, the driver-specific threshold deceleration is calculated at block 443 without determining who specifically is driving the vehicle 1. The threshold calculated at block 443 may be a "default" threshold based on historical average deceleration of the vehicle 1, or based on a threshold pre-programmed by a vehicle user such as a driver.

If block 450 determines that the current reduction in the rate of closure exceeds the driver-specific threshold deceleration then the method 400 proceeds to block 473. This is because it is deduced that the driver is braking or coasting to decelerate the vehicle 1 to a stop in accordance with the driver's normal deceleration behaviour, so there is no reason to expect a future rapid increase in propulsion demand for avoiding collision with the object.

If the current reduction in the rate of closure does not exceed the driver-specific threshold deceleration, for example if there is no current reduction in the rate of closure (vehicle 1 is accelerating or coasting), the method 400 proceeds to block 460.

Determining whether a hazard is present comprises, at block 460, determining whether the vehicle 1 is being controlled to reduce the rate of closure. In some examples block 460 evaluates whether the driver's actions suggest they will increase the average rate of deceleration.

Examples in which it is determined that the vehicle 1 is being controlled to reduce the rate of closure include at least one of: determining, at block 452, a driver increase in braking effort, from driver action information provided at block 451 such as brake pedal depression and/or brake pedal pressure information; or determining, at block 454, a driver decrease in propulsion effort demand, from different driver action information provided at block 453 such as accelerator pedal position information.

In some examples the increase in braking effort and/or decrease in propulsion effort demand is compared with one or more thresholds before making the determination whether the vehicle 1 is being controlled to reduce the rate of closure.

If it is determined that the vehicle 1 is being controlled to reduce the rate of closure then the method 400 proceeds to block 473. This is because it is deduced that the driver is in the process of commanding the vehicle 1 to come to a stop, so there is no reason to expect a future rapid increase in propulsion demand for avoiding collision with the object.

If block 460 determines that the vehicle 1 is not being controlled to reduce the rate of closure, the second condition of identifying a propulsion demand has been met; therefore the method 400 of FIG. 4 has made a final determination that a hazard is present.

In other examples additional steps can be provided for more accurately determining whether a hazard is present.

The final determination that a hazard is present means that the driver is expected to increase or is increasing propulsion demand to accelerate the vehicle 1, instead of stopping, and will require the internal combustion engine 3 to be in the on state for performing the maneuver.

In response to the method 400 making the final determination that a hazard is present, the method 400 does not command the internal combustion engine 3 to be switched to the off state in dependence on a current low propulsion demand. Specifically, the method 400 proceeds to block 470, determining whether the internal combustion engine 3 is currently in the on state ('active state') in dependence on current low propulsion demand.

If the internal combustion engine 3 is in the on state, the method 400 proceeds to block 472, which prevents the internal combustion engine 3 from entering the off state ('inactive state') in dependence on current low propulsion demand.

If the internal combustion engine 3 is currently in the off state in dependence on current low propulsion demand, the method 400 proceeds to block 471, which causes or performs switching of the internal combustion engine 3 to the on state from the off state.

Therefore not commanding the internal combustion engine 3 to be switched to the off state in dependence on a current low propulsion demand includes both: preventing the internal combustion engine 3 from entering the off state; and causing or performing switching of the internal combustion engine 3 to the on state if it is currently in the off state, In some examples the method 400 then loops back to blocks 401 and 402 to receive updated input indicative of an updated current external environment proximal to the vehicle 1. The method 400 can loop in a real-time manner while the input is updated in a real-time manner.

Figure 5:
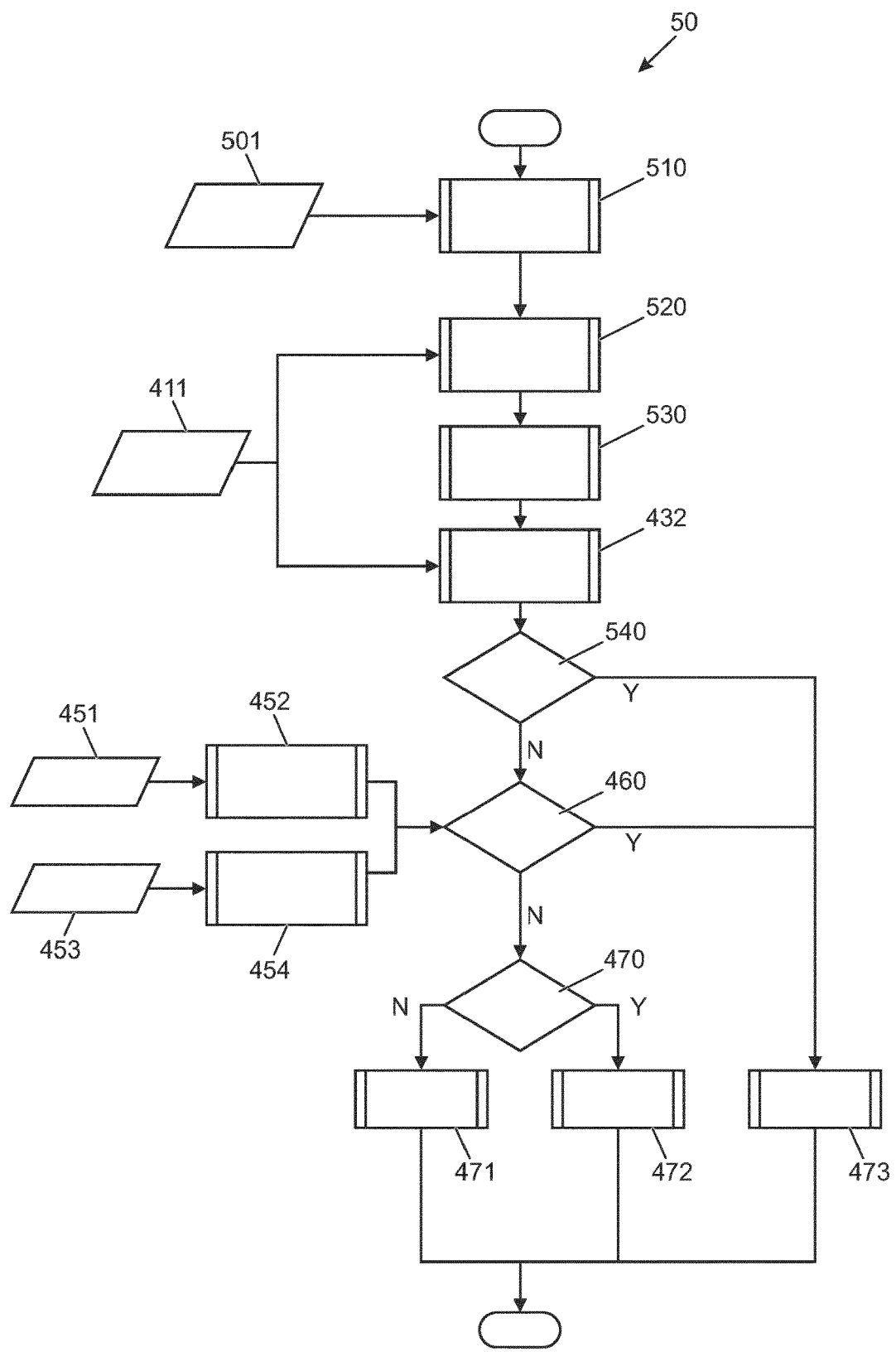
FIG. 5 illustrates another example method 500.

FIG. 5 illustrates a second example of a method 500 which relates to an overtaking scenario. Except where stated explicitly in the following description, it is to be understood that the method 500 is identical to the method 400.

The method 500 comprises, at block 501, receiving input indicative of the current external environment proximal to the vehicle 1, for example local real-time context data. In some examples the local real-time context data is as described in relation to block 401. In other examples the local real-time context data is indicative only of the environment ahead of the vehicle 1 and in the path of the vehicle 1. For example the inputs are received from a forward facing imaging sensor, and/or a forward facing LIDAR and/or radar sensor. In some examples the additional input as described in block 402 is not required.

The method 500 proceeds to block 510. The difference between block 510 and block 410 is that in block 510 the recognized object requires the driver to make a decision whether to decelerate the vehicle 1 without necessarily stopping, for example the object is any moving object such as another road user. The road user could be a slower moving vehicle in front of and in the path of the vehicle 1, travelling in the same direction as the vehicle 1.

In some examples the first condition as described in relation to block 305 is met when another vehicle is identified in front of the vehicle 1, for instance by appropriate control of the threshold for meeting the first condition.

In order to overtake the object the driver would be expected to rapidly increase propulsion demand. However the driver may also have a choice to decelerate the vehicle 1 to follow the other road user.

In some, but not necessarily all examples, the inputs are processed to monitor the road for overtaking opportunities. In some examples the type of road is determined, for example whether the road is bi-directional or multi-lane. In some examples signs indicating overtaking rights for the vehicle 1 (road paint and road signs) are recognized.

In some examples the object presents an active hazard because a maneuver will be required by the vehicle 1 and/or by the other road user to avoid collision. In some examples objects presenting passive hazards are not recognized in block 510. Other aspects of block 510 are as described in relation to block 410.

The method 500 proceeds to block 520. Determining whether a hazard is present comprises, at block 520, determining a rate of closure between the vehicle 1 and the sensed object, wherein the sensed object is the other road user. Other aspects of block 520 are as described in relation to block 420.

The method 500 proceeds to block 530. Determining whether a hazard is present comprises, at block 530, calculating a threshold change in the rate of closure, for example deceleration of the vehicle 1, for not overtaking the other road user. A generic or vehicle-model specific threshold deceleration can be calculated in block 530 which can have a different value from the threshold deceleration of block 430. Other aspects of block 530 are as described in relation to block 430.

The method 500 proceeds to block 432 which is as described in relation to the method 400.

The method 500 proceeds to block 540. Determining whether a hazard is present comprises, at block 540, determining whether a current reduction in the rate of closure, determined for example at block 432, exceeds the threshold change, for example threshold deceleration, calculated at block 530. Other aspects of block 540 are as described in relation to block 440.

Although not shown in the method 500, the method 500 could proceed in other examples to a block similar or equivalent to the block 450 of the method 400.

The method 500 then proceeds to block 460, to block 470 and to one of blocks 471 or 472, each of which is as described in relation to the method 400.

Figure 6:
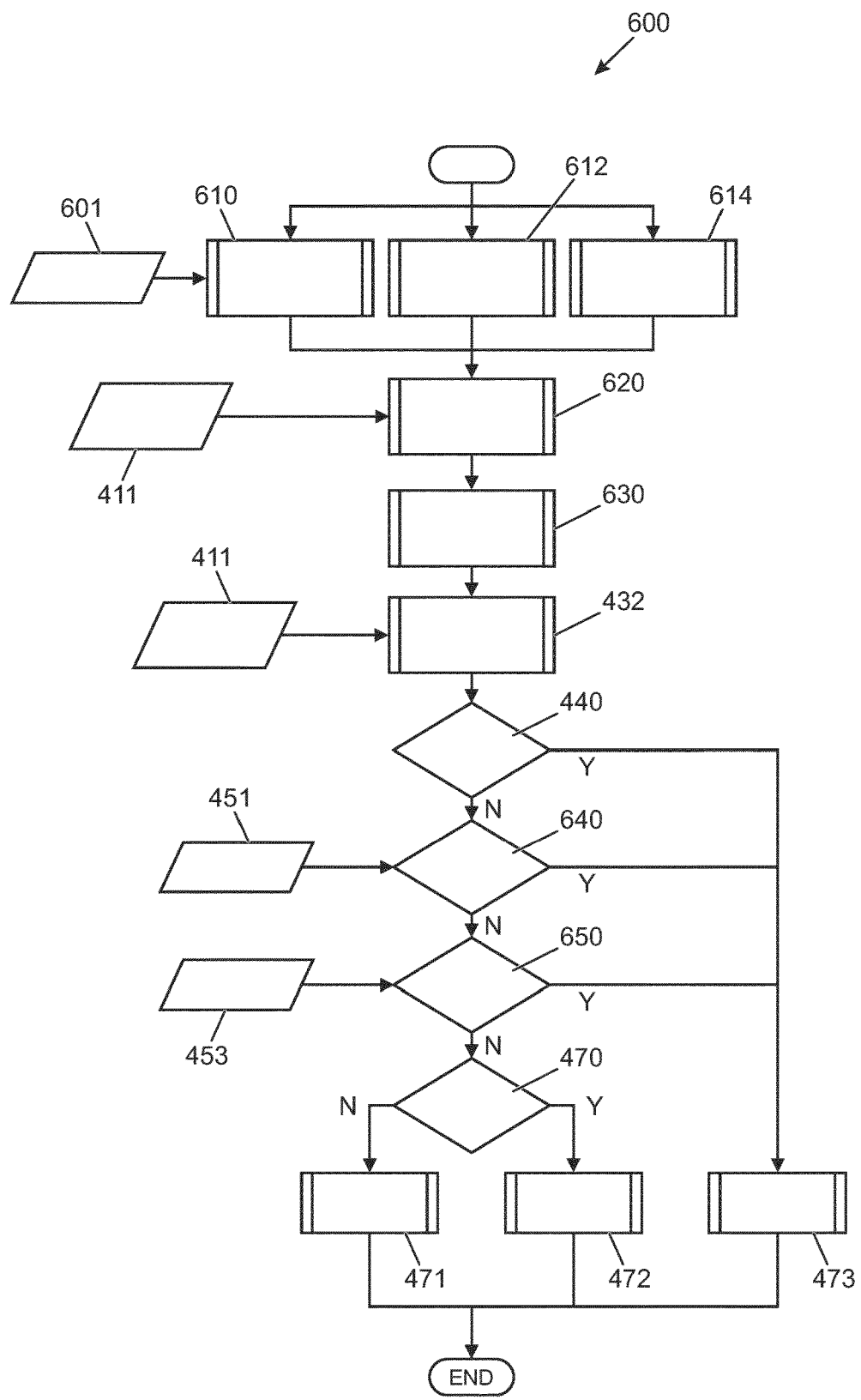
FIG. 6 illustrates another example method 600.

FIG. 6 illustrates a third example of a method 600 which relates to a vehicle wading scenario. Except where stated explicitly in the following description, it is to be understood that the method 600 is identical to the method 400.

The method 600 comprises, at block 601, receiving inputs indicative of the current external environment proximal to the vehicle 1, for example receiving local real-time context data.

The inputs comprise data enabling information to be determined indicating the depth of water, by processing of the data. The inputs relate specifically to the environment ahead of the vehicle 1 and/or under the vehicle 1, for example inputs from forward and/or downward facing imaging sensors, and/or forward and/or downward facing LIDAR and/or radar and/or laser sensors. In some examples the additional input as described in block 402 is not required.

In some examples the input comprises information regarding the type of road surface, for example whether it is paved or unpaved.

The method 600 proceeds from block 610, 612 or 614. The method 600 performs block 610 instead of 612 or 614 if an upcoming area of water >X cm deep is sensed when the vehicle 1 is on a paved road.

The method 600 performs block 612 instead of block 610 or 614 if it is sensed that the vehicle 1 is already within water >Y cm deep.

The method 600 performs block 614 instead of block 610 or 612 if an upcoming area of water >X cm deep is sensed and the vehicle 1 is on an unpaved path.

In some examples, the depth X is within the range 50 cm to 150 cm, for example 90 cm. In some examples the depth X is vehicle dependent and can represent a maximum safe wading depth of the specific vehicle 1. The depth X may be dependent on the size and type of vehicle 1. The depth X may be at the upper end of the range for a vehicle 1 having a high ground clearance, such as a sports utility vehicle. The depth X may be at the lower end of the range for a vehicle 1 having a relatively low ground clearance.

The driver is expected to provide a propulsion demand if driving through the water >X cm deep, for example to maintain gas pressure in its exhaust system (not shown) to avoid flooding of the internal combustion engine 3 via its exhaust system. The depth X may be a depth in which flooding of the internal combustion engine 3 may occur if the internal combustion engine 3 is in the off state but not if the internal combustion engine 3 is in the on state.

In some examples, the depth Y is greater than 0 cm and less than depth X. Puddles could be excluded if depth Y is greater than a typical depth of a puddle such as 10 cm.

If the driver is not expected to provide a propulsion demand, the driver may wish to stop the vehicle 1 before entering the water hazard.

Therefore the water >X cm deep is an example of an environment likely to require deceleration of the vehicle 1.

In some examples the first condition as described in relation to block 305 is met when the water >X cm deep is identified in front of the vehicle 1, for instance by appropriate control of the threshold for meeting the first condition.

Determining whether a hazard is present comprises, at block 610 or 612 or 614 as appropriate, sensing in the current external environment proximal to the vehicle 1 an object corresponding to water >X cm deep ahead of the vehicle 1. Other aspects of blocks 610, 612 and 614 are as described in relation to block 410.

The water >X cm deep presents a passive hazard because the water is a topography feature, i.e. a terrain feature capable of causing damage to at least the vehicle 1, in this case a submerged driving surface. A submerged driving surface is an example of an environment in which the chance of an active hazard arising such as the vehicle 1 being stranded in deep water is high.

The method 600 proceeds to block 620. Determining whether a hazard is present comprises, at block 620, determining a rate of closure between the vehicle 1 and the sensed object, i.e. the rate of closure to the upcoming water hazard. Other aspects of block 620 are as described in relation to block 420.

The method 600 proceeds to block 630. Determining whether a hazard is present comprises, at block 630, calculating a threshold change in the rate of closure, for example deceleration of the vehicle 1, for stopping the vehicle 1 before the vehicle 1 enters the water hazard. A generic or vehicle-model specific threshold deceleration can be calculated in block 630. Any threshold deceleration calculated in block 630 can have a different value to the threshold deceleration of block 430. Other aspects of block 630 are as described in relation to block 430.

The method 600 proceeds to block 432 which is as described in relation to the method 400.

The method 600 proceeds to block 440 which is as described in relation to the method 400.

Although not shown in the method 600, the method 600 proceeds in some examples to a block similar or equivalent to the block 450 of the method 400.

The method 600 then proceeds to block 640 which determines if the driver is increasing braking effort above a threshold, using information 451 as described in relation to the method 400. If the driver is increasing braking effort above the threshold, then the method 600 proceeds to block 473 as described in relation to the method 400. This is because the driver is deduced to be stopping the vehicle 1.

If the driver is not increasing braking effort above the threshold, then the method 600 proceeds to block 650 which determines if the driver is reducing accelerator pedal input beyond a threshold, using information 453 as described in relation to the method 400. If the driver is reducing accelerator pedal input beyond the threshold, then the method 600 proceeds to block 473 as described in relation to the method 400. This is because the driver is deduced to be stopping the vehicle 1.

If the driver is not reducing accelerator pedal input beyond the threshold, then the method 600 proceeds to block 470 and to one of the blocks 471 or 472, each of which is as described in relation to the method 400.

In other examples blocks 640 and 650 can be replaced by blocks 452, 454 and 460 as described in relation to the method 400.

Although the methods 300, 400, 500 and 600 have been described above as separate methods, the methods may be performed as a single method, which can be performed concurrently or simultaneously.

The blocks illustrated in FIGS. 4 to 6 may represent steps in a method and/or sections of code 8 in the computer program 7. The illustration of a particular order to the blocks does not necessarily imply that there is a required or preferred order for the blocks and the order and arrangement of the block may be varied. Furthermore, it may be possible for some steps to be omitted.

For purposes of this disclosure, it is to be understood that the controller(s) 4 described herein can each comprise a control unit or computational device having one or more electronic processors. A vehicle 1 and/or a system thereof may comprise a single control unit or electronic controller or alternatively different functions of the controller(s) may be embodied in, or hosted in, different control units or controllers. A set of instructions could be provided which, when executed, cause the controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

A controller 4 "enabling" a certain function to be performed encompasses the controller 4 directly performing the function as well as the controller 4 indirectly performing the function, for example by causing another different controller to directly perform the function. The term "enabling" also encompasses the controller 4 performing the function immediately or performing the function at a later time, for example the controller 4 only performing the function when a condition is met.

Although embodiments of the present invention have been described in the preceding paragraphs with reference to various examples, it should be appreciated that modifications to the examples given can be made without departing from the scope of the invention as claimed. For example, it would be appreciated that the internal combustion engine 3 in the off state could remain running, but may only power vehicle peripherals such as an alternator, while being decoupled from vehicle wheel(s) 10 and therefore unable to cause the vehicle 1 to accelerate.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

While endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of controlling an internal combustion engine of a vehicle, the method comprising:
receiving at least one input indicative of a current external environment proximal to the vehicle;
determining a rate of closure between the vehicle and a sensed object;
calculating a threshold reduction in the rate of closure, wherein the threshold is calculated as a reduction in the rate of closure no higher than an average reduction in the rate of closure required if the vehicle is to not overtake the sensed object or to stop before reaching or colliding with the sensed object;
determining in dependence on the at least one input whether a hazard is present, wherein determining that a hazard is present comprises determining that a current reduction in the rate of closure of the vehicle does not exceed the threshold;
determining a current propulsion demand of the vehicle;
if it is determined that the current propulsion demand is low, either commanding switching of the internal combustion engine to an off state if it is determined that a hazard is not present, or not commanding switching of the internal combustion engine to the off state if it is determined that a hazard is present; and
if it is determined that the current propulsion demand is high, commanding switching of the internal combustion engine to an on state if the internal combustion engine is in the off state.

2. The method as claimed in claim 1, wherein the threshold is calculated as a value from the range 0.1 g to 0.4 g of deceleration.

3. The method as claimed in claim 1, comprising:
processing the at least one input to identify a second vehicle in front of the vehicle;
processing the at least one input to monitor a road on which the vehicle is travelling for an opportunity to overtake the second vehicle,
wherein the hazard is determined to be present if it is determined that a driver of the vehicle is likely to increase or is increasing propulsion demand for overtaking the second vehicle.

4. The method as claimed in claim 1, wherein determining whether a hazard is present comprises determining a type of junction which the vehicle is approaching, comprising determining whether the junction is one of a cross-roads, a roundabout or a T-junction.

5. The method as claimed in claim 1, wherein if it is determined that the current propulsion demand is low, and the internal combustion engine is in the off state, the method comprises either commanding switching of the internal combustion engine to the on state if it is determined that a hazard is present, or not commanding switching of the internal combustion engine to the on state if it is determined that a hazard is not present.

6. The method as claimed in claim 1, wherein
determining that a hazard is not present comprises determining an expected low or no increase of future propulsion demand, and
wherein determining that a hazard is present comprises determining an expected future propulsion demand or increase of propulsion demand.

7. The method as claimed in claim 1, wherein the at least one input comprises inputs from a plurality of different sensors.

8. The method as claimed in claim 1, wherein the at least one input comprises at least one of: image data; location data; pulse reflection data; information received from another vehicle and/or from an infrastructure management system via a wireless network.

9. The method as claimed in claim 1, wherein determining whether a hazard is present comprises sensing in the current external environment proximal to the vehicle an environment likely to require deceleration of the vehicle.

10. The method as claimed in claim 1, wherein determining whether a hazard is present comprises determining a rate of closure between the vehicle and a sensed object.

11. The method as claimed in claim 10, wherein determining that a hazard is present comprises determining that the vehicle and the sensed object are converging.

12. The method as claimed in claim 10, wherein determining whether a hazard is present comprises determining a current reduction in the rate of closure.

13. The method as claimed in claim 1, wherein the hazard comprises at least one of: an active hazard that arises because of actions taken by the driver of the vehicle and/or by other road users; and a passive hazard that arises because of at least one of: road layout, road infrastructure, and topography.

14. The method as claimed in claim 13, wherein the passive hazard comprises at least one of: a terrain feature capable of causing damage to at least the vehicle; a road layout feature giving other road users right of way; or a road infrastructure feature giving other road users right of way.

15. The method as claimed in claim 14, wherein the terrain feature comprises a submerged driving surface.

16. A controller comprising at least one processor configured to perform the method of claim 1.

17. A vehicle comprising the controller of claim 16.

18. A non-transitory computer readable storage medium storing computer program instructions that, when performed by at least one processor, causes the method of claim 1 to be performed.

19. A method of controlling an internal combustion engine of a vehicle, the method comprising:
receiving at least one input indicative of a current external environment proximal to the vehicle;
determining a rate of closure between the vehicle and a sensed object;

calculating a threshold reduction in the rate of closure, wherein the threshold is driver-specific, determining in dependence on the at least one input whether a hazard is present, wherein determining that a hazard is present comprises determining that a current reduction in the rate of closure of the vehicle does not exceed the threshold;

determining a current propulsion demand of the vehicle;

if it is determined that the current propulsion demand is low, either commanding switching of the internal combustion engine to an off state if it is determined that a hazard is not present, or not commanding switching of the internal combustion engine to the off state if it is determined that a hazard is present; and if it is determined that the current propulsion demand is high, commanding switching of the internal combustion engine to an on state if the internal combustion engine is in the off state.

20. A method of controlling an internal combustion engine of a vehicle, the method comprising:

receiving at least one input indicative of a current external environment proximal to the vehicle;

determining a rate of closure between the vehicle and a sensed object;

calculating a threshold reduction in the rate of closure, wherein the threshold depends on a measured gradient of a road on which the vehicle is travelling, determining in dependence on the at least one input whether a hazard is present, wherein determining that a hazard is present comprises determining that a current reduction in the rate of closure of the vehicle does not exceed the threshold;

determining a current propulsion demand of the vehicle;

if it is determined that the current propulsion demand is low, either commanding switching of the internal combustion engine to an off state if it is determined that a hazard is not present, or not commanding switching of the internal combustion engine to the off state if it is determined that a hazard is present; and if it is determined that the current propulsion demand is high, commanding switching of the internal combustion engine to an on state if the internal combustion engine is in the off state.

* * * * *